(12) United States Patent
Sheldon

(10) Patent No.: US 6,971,745 B2
(45) Date of Patent: Dec. 6, 2005

(54) EYEWEAR HAVING LENSES WITH RIMS

(76) Inventor: Brent Sheldon, 315 Putney Street, St. Lambert, Quebec (CA) J4P 3B5

( * ) Notice: Subject to any disclaimer, the term of this patent is extended or adjusted under 35 U.S.C. 154(b) by 0 days.

(21) Appl. No.: 10/834,090

(22) Filed: Apr. 29, 2004

(65) Prior Publication Data

US 2005/0073645 A1    Apr. 7, 2005

Related U.S. Application Data

(63) Continuation-in-part of application No. 10/677,351, filed on Oct. 3, 2003, now abandoned.

(51) Int. Cl.[7] ............................................. G02C 1/00
(52) U.S. Cl. .................... 351/86; 351/62; 351/154; 2/435
(58) Field of Search ............................. 351/41, 43, 62, 351/83–86, 154; 2/435–437

(56) References Cited

U.S. PATENT DOCUMENTS

| | | | |
|---|---|---|---|
| 4,689,838 A | | 9/1987 | Angermann et al. |
| 4,971,431 A | | 11/1990 | Gerard |
| 5,371,554 A | | 12/1994 | Aspesi |
| 5,631,716 A | * | 5/1997 | Chao ........................... 351/41 |
| 5,796,461 A | * | 8/1998 | Stepan ........................ 351/106 |
| 5,898,468 A | * | 4/1999 | Mage ............................ 351/62 |
| 6,074,059 A | * | 6/2000 | Glass et al. .................... 351/86 |
| 6,086,199 A | | 8/2000 | Holland et al. |
| 6,592,220 B1 | | 7/2003 | Cheong |
| 6,676,257 B2 | | 1/2004 | Sheldon |
| 2002/0021406 A1 | | 2/2002 | Horn et al. |
| 2002/0029408 A1 | | 3/2002 | Lindahl |

FOREIGN PATENT DOCUMENTS

| | | | | |
|---|---|---|---|---|
| CA | 2283413 | | 9/1998 | |
| FR | 2615004 | * | 11/1988 | ................... 351/86 |

* cited by examiner

*Primary Examiner*—Huy Mai
(74) *Attorney, Agent, or Firm*—Ogilvy Renault LLP; Wayne H. Yan

(57) ABSTRACT

A method for assembly of an eyewear and an eyewear structure are provided to incorporate preferred properties into the eyewear. A lens is encircled by a rim element having the preferred properties thereby forming a lens unit which is removably attached to the eyewear structure. Therefore, the lens can be better retained within the eyewear structure. Such lens units can be made interchangeable one to another, and with a variety of individual properties such that replacement of the lens unit attached to the eyewear structure with a selected one of the interchangeable lens units, will change the properties of the eyewear as per user's preferences.

18 Claims, 12 Drawing Sheets

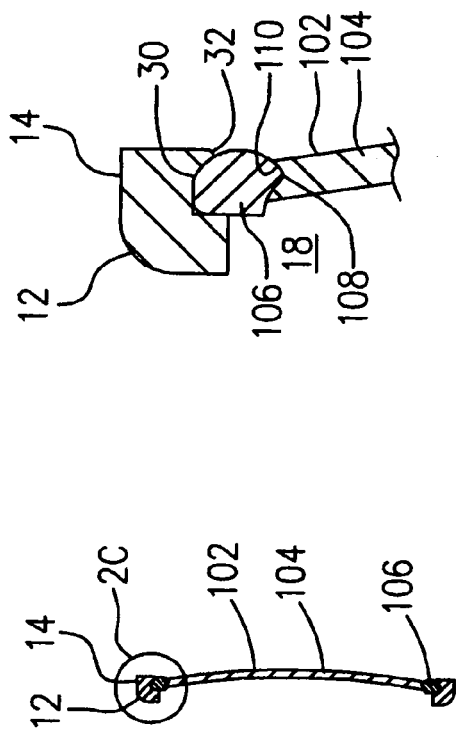
FIG. 2B
FIG. 2C
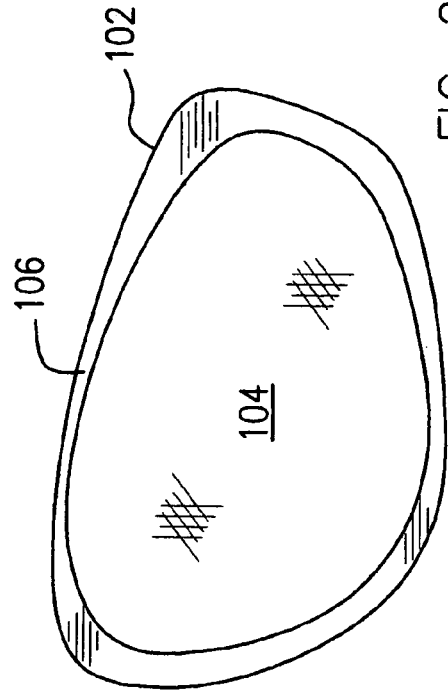
FIG. 2D
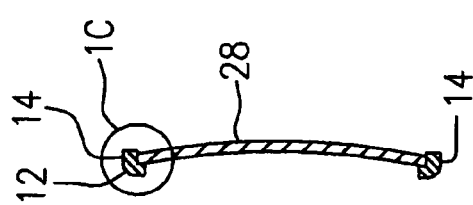
FIG. 1B
PRIOR ART
FIG. 1C
PRIOR ART

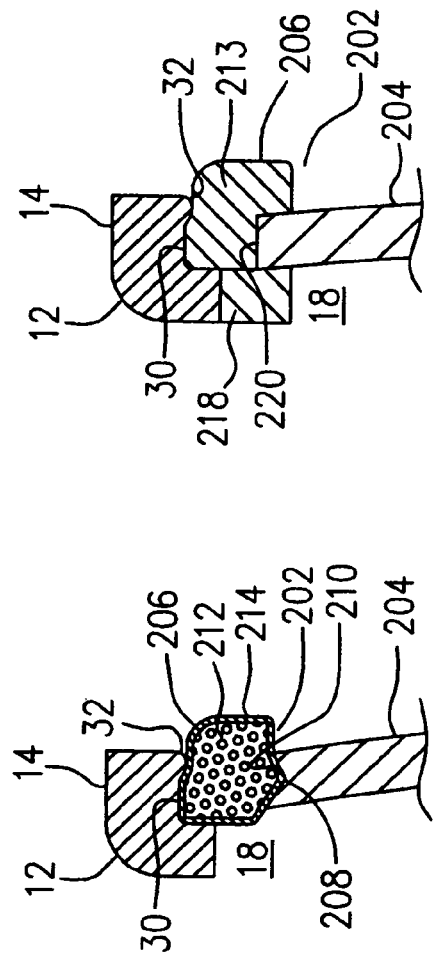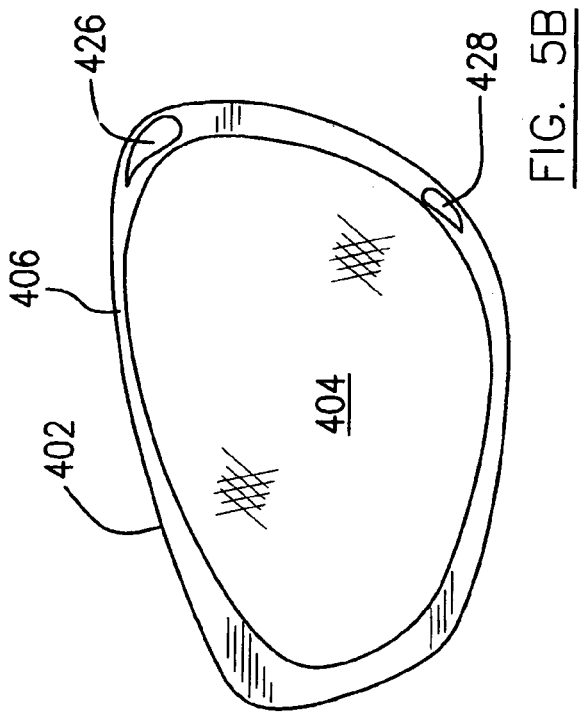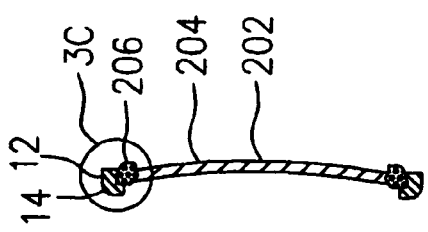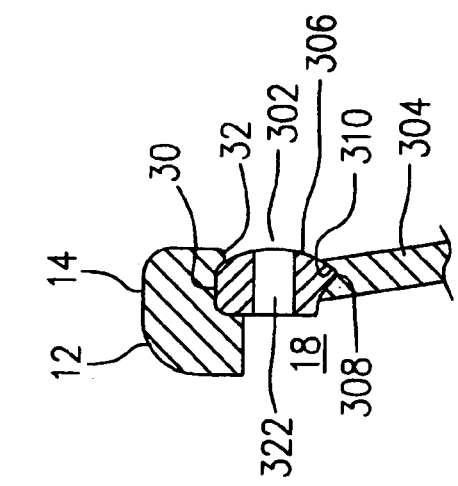

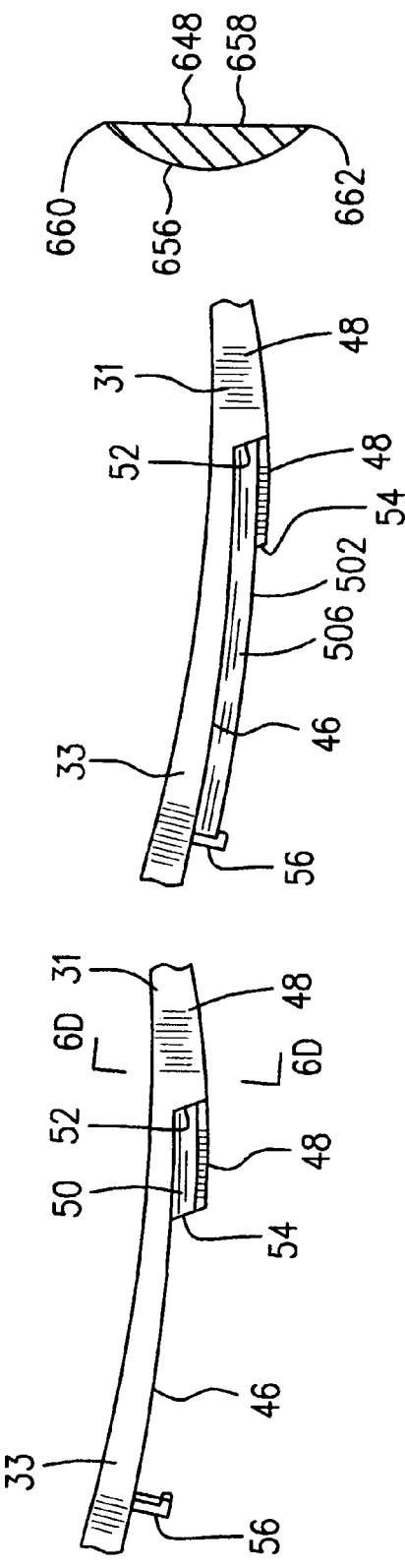
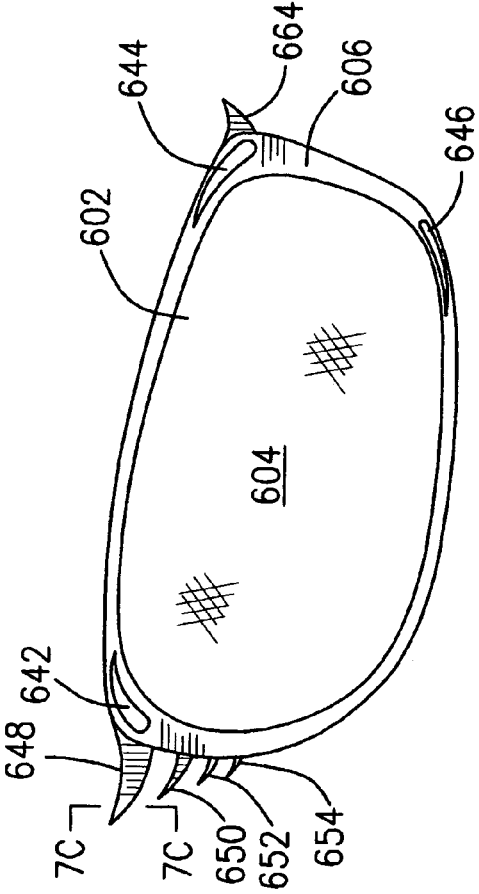
FIG. 7C
FIG. 6D
FIG. 6C
FIG. 7D
FIG. 6B
FIG. 7B

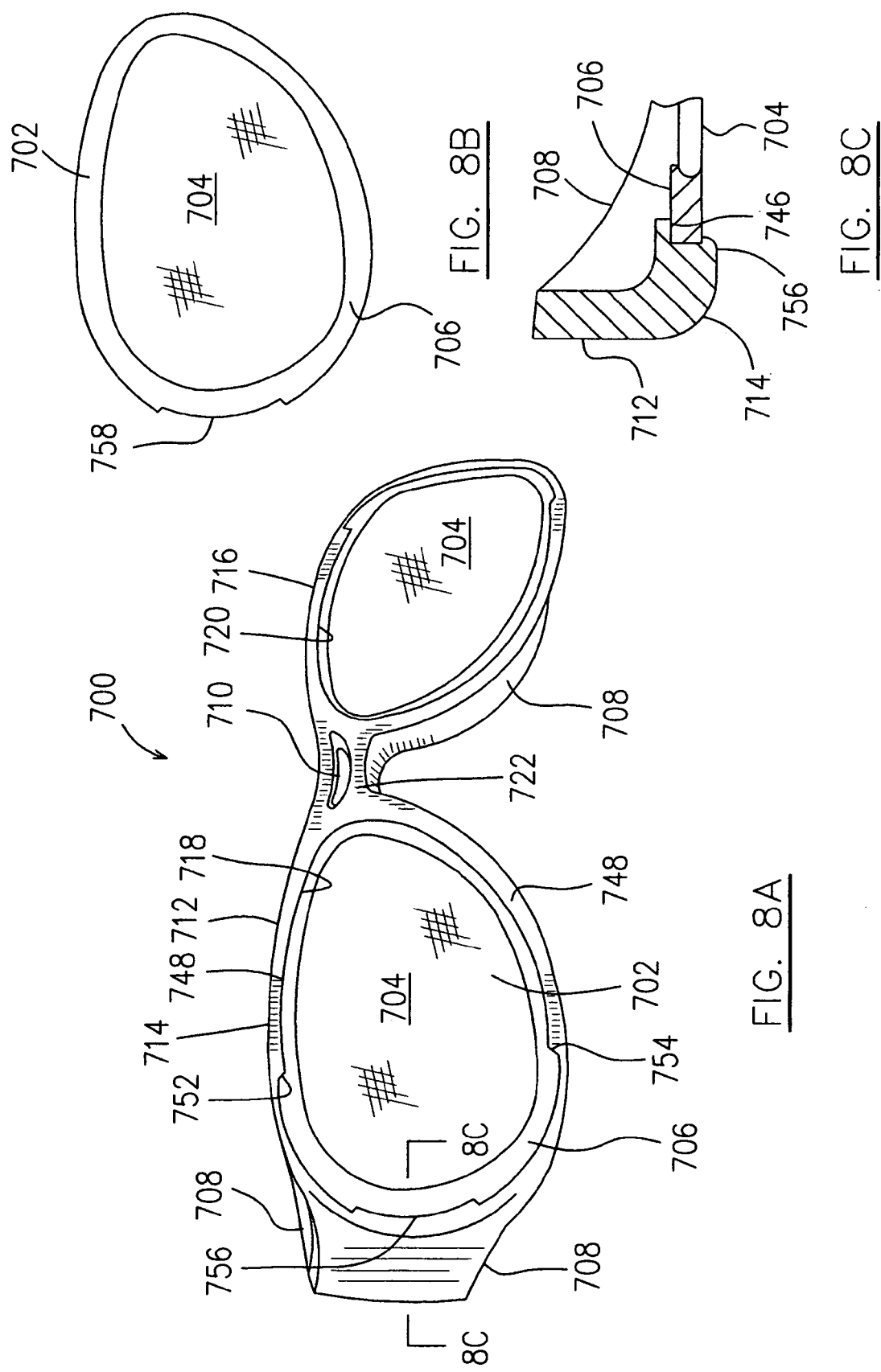

US 6,971,745 B2

EYEWEAR HAVING LENSES WITH RIMS

CROSS-REFERENCE TO RELATED APPLICATIONS

This is a Continuation in Part of Applicant's U.S. patent application Ser. No. 10/677,351, filed on Oct. 3, 2003 abandoned.

TECHNICAL FIELD

The present invention relates to eyewear, and more particularly to lens units which provide a selectable variety of properties to the eyewear to which the lens units are attached.

BACKGROUND OF THE INVENTION

Conventional eyewear are generally catalogued into two groups. The first group includes swimming or diving goggles characterized by waterproof seals when the eyewear is in use. In this group, lenses are firmly secured to the eyewear structures, usually by flexible or semi-flexible sealing devices either integrated with the frame structures or additionally attached thereto, and flexible or semi-flexible seals are also provided to the frame structures to abut the user's face around the eyes in order to prevent water from contacting the user's eyes.

The second group of eyewear includes a variety of eyeglasses, protective work glasses and a particular type of sports goggles, which are all characterized as having no special sealing requirements and as permitting air ventilation through specially designed air passages through the frame structures or generally through a space between the frame structures and the user's face while in use. These eyewear, typically sunglasses and prescription eye glasses generally include a frame structure made of metal or rigid plastic material defining a pair of openings for securing a pair of lenses fitted therein. Although the lenses can be replaced, for example when broken, they are generally not designed for interchangeable use. Such lenses are usually made of glass or rigid transparent plastics which have limited resiliency properties such that relatively frequent attachment and detachment of the lenses to and from the frame structures will soon wear out both the peripheral edge of the lenses and the openings of the frame structure, thereby causing undesirable detachment of the lenses from the frame structure. Eyeglasses users unfortunately sometimes suffer the loss of lenses from their eyeglasses because the lenses have become less firmly retained within the openings of the frame structure over a period of useage.

In today's life an eyeglasses user often needs more than one pair of glasses to meet various vision needs. For example, a sunglasses user may prefer a selected styling for general use, but prefers sunglasses with better ventilation when used during sports activities. Under some special conditions such as during water skiing or other water sports, a pair of floatable sunglasses may be preferred. In the case of prescription eyeglasses, a user may need to carry a pair of reading glasses and a pair of distance glasses at all times. Eyeglasses having combined reading and distance lenses are available in the market, however, some users are uncomfortable with such eyeglasses because of the need to adjust viewing angles in order to view through the appropriate portion of the combined lenses for distance and reading.

Therefore, improved eyewear, particularly eyeglasses, are desirable in order to overcome the shortcomings of the conventional eyewear.

SUMMARY OF THE INVENTION

One object of the present invention is to provide improved eyewear to overcome the shortcomings of the conventional eyewear.

In accordance with one aspect of the present invention, there is provided a method for assembling eyewear which comprises providing a frame structure for the eyewear, the frame structure defining at lease one opening; providing a lens unit including a lens and a rim element, the rim element encircling the lens and having a dimension to be visible in a front view of the eyewear when the lens unit is attached to the frame structure; and removably attaching the lens unit to the frame structure to cover the opening.

The method preferably comprises selective replacement of the lens unit attached to the frame structure with another lens unit when changing properties of the eyewear is desirable.

In accordance with another aspect of the present invention, there is provided an eyewear which comprises a frame structure defining at least one opening, and a lens unit removably attached to the frame structure and covering the opening thereof. The lens unit includes a lens and a rim element encircling the lens. The rim element has a dimension to be visible in a front view of the eyewear. A plurality of interchangeable lens units are provided and are adapted for selective replacement of the lens unit attached to the frame structure.

The rim elements of the respective interchangeable lens units are preferably made of different materials, or are in different colors.

In accordance with a further aspect of the present invention, there is provided an eyewear permitting air ventilation when in use, which comprises a frame structure defining a pair of openings and a pair of lens units removably attached to the frame structure for covering the respective openings thereof. Each of the lens units includes a lens and a rim element encircling the lens.

The rim element of the respective lens units is preferably made of a material selected from a group of materials consisting of metal, plastics, rubber, wood, elastomeric material and foam material. The rim element of the respective lens units preferably comprises a passage extending therethrough for facilitating air ventilation when the eyewear is in use.

The lens unit with the rim element encircling the lens according to the present invention, advantageously provides a better retention of the lens within the eyewear frame structure because the rim can be made of a selected material with appropriate resiliency to be securely retained within the opening of the frame structure. Optionally, a frame structure can be provided with special retaining configurations which are usually not appropriate for frame structures to retain conventional glass or plastic lenses, for a better retention of the rim of the lens units within the frame structure.

Another advantage of the present invention lies in that a variety of selective features of the rim of the lens unit can be easily added to the eyewear to which the lens unit is attached, thereby changing the properties of the eyewear to meet users' preferences.

Furthermore, the present invention provides the advantage of interchangeability of the lens units to the frame structures, which not only benefits users by making it possible to have only one eyewear for different applications, but also benefits the manufacturers by simplifying eyewear design and manufacturing procedures to assemble various eyewear by combination of the same eyewear frame structures with various configurations of lens units.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which:

FIG. 1B is a cross-sectional view of the conventional sunglasses of FIG. 1A, taken along line 1B—1B, showing the conventional attachment of a lens to the frame structure;

FIG. 1C is a partial cross-sectional view of the encircled area indicated as 1C in FIG. 1B, showing in greater detail, the attachment of the lens to the frame structure;

FIG. 2B is a cross-sectional view of the embodiment of FIG. 2A, taken along line 2B—2B and showing the attachment of a lens unit to a frame structure of the embodiment of 2A;

FIG. 2C is a partial cross-sectional view of the encircled area indicated as 2C in FIG. 2B, showing in greater detail, the attachment of the lens unit to the frame structure;

FIG. 2D is a front elevational view of the lens unit used in the embodiment of FIG. 2A;

FIG. 3B is a cross-sectional view taken along line 3B—3B of FIG. 3A, showing the attachment of the lens unit to the frame structure of the embodiment of 3A;

FIG. 3C is a partial cross-sectional view of the encircled area indicated as 3C in FIG. 3B, showing in greater detail, the attachment of the lens unit to the frame structure;

FIG. 3D is a partial cross-sectional view of the encircled area indicated as 3C in FIG. 3B, showing in greater detail, the attachment of an alternative lens unit to the frame structure;

FIG. 4B is a partial cross-sectional view taken along line 4B—4B of FIG. 4A, showing a ventilation passage through a rim of the lens unit attached to the frame structure of the embodiment of FIG. 4A;

FIG. 5B is a rear elevational view of a lens unit used in the embodiment of FIG. 5A;

FIG. 6B is a partial top plan view, showing a section of the frame structure of FIG. 6A, including the retaining elements with the lens unit removed;

FIG. 6C is a partial top plan view of FIG. 6A, similar to the view of FIG. 6B, but with the lens unit attached thereto;

FIG. 6D is a partial cross-sectional view of FIG. 6B, taken along line 6D—6D, showing in greater detail, the retaining elements;

FIG. 7B is a front perspective view of a lens unit used in the embodiment of FIG. 7A;

FIG. 7C is a partial cross-sectional view taken along line 7C—7C from FIG. 7B, showing in detail, one projecting retaining element of the lens unit of the embodiment of FIG. 7A;

FIG. 7D is a partial cross-sectional view taken along line 7D—7D from FIG. 7A showing in detail, a recess defined in the frame structure for accommodating the retaining element illustrated in FIG. 7C;

FIG. 8A is a perspective view of a pair of goggles with an elastic strap removed, illustrating a seventh embodiment of the present invention;

FIG. 8B is a front elevational view of a lens unit used in the embodiment of FIG. 8A;

FIG. 8C is a partial cross-sectional view of FIG. 8A taken along line 8C—8C, showing the cross-sectional structures of the central retainer and the indent of the rim.

DETAILED DESCRIPTION OF THE PREFERRED EMBODIMENT

Figure 1A:
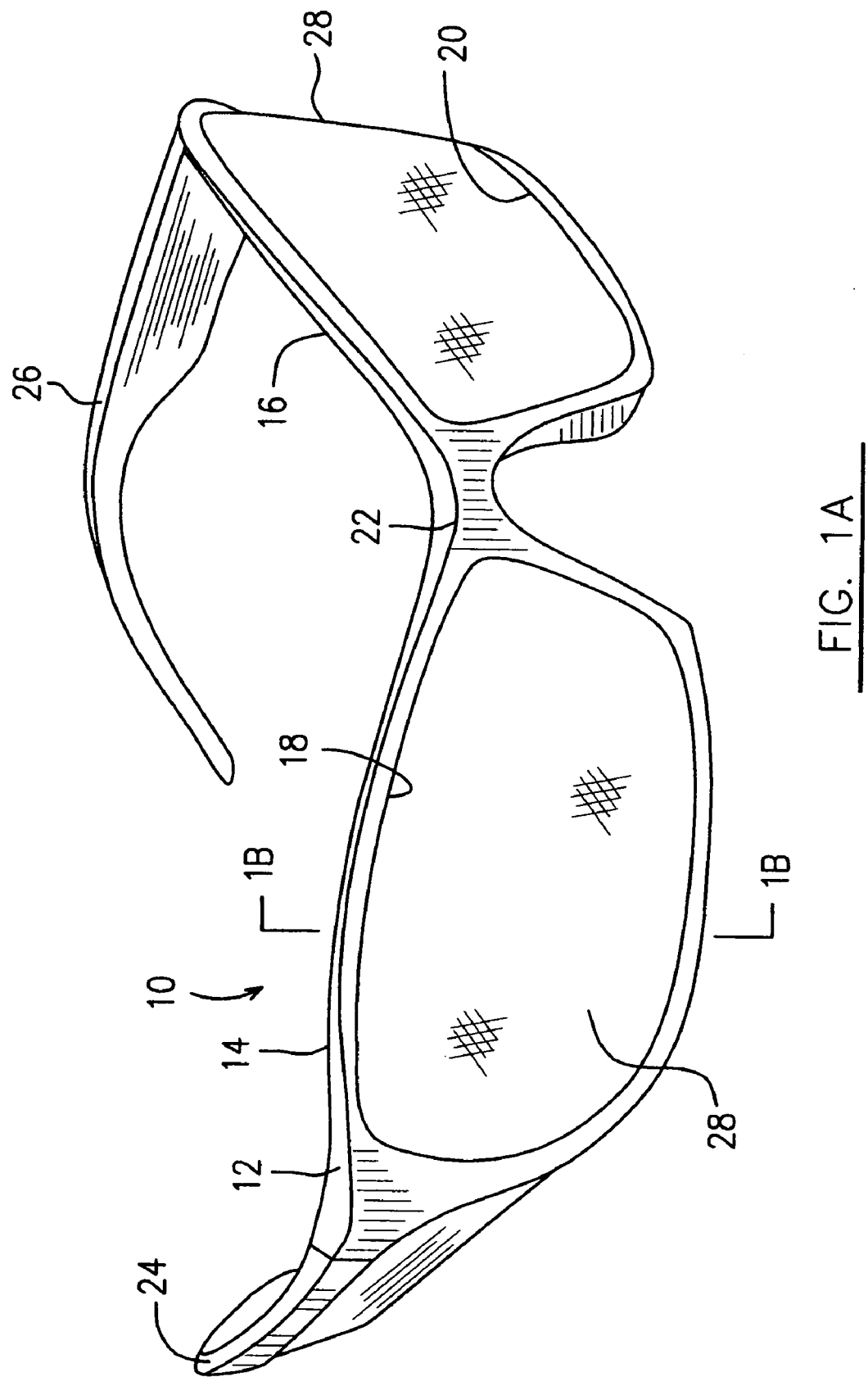
FIG. 1A is a perspective view of a pair of conventional sunglasses.

FIGS. 1A–1C illustrate a pair of conventional sunglasses 10 which includes a frame structure 12 made of rigid plastic material. The frame structure 12 generally includes two frame sections 14, 16 defining openings 18, 20 therein, respectively. A bridge 22 interconnects the two frame sections 14 and 16 and extends between the inner ends thereof. A pair of temples 24 and 26 are pivotally attached to an outer end of the respective frame sections 14, 16. Each of the frame sections 14, 16 of the frame 12, has a lens 28 affixed within the respective openings 18, 20.

In order to secure the lens to the respective frame sections 14, 16, the inner periphery of the openings 18, 20 defines a shallow circumferential recess 30. The lens 28 has a radial dimension to be snuggly fitted into the recess 30, thereby being frictionally retained within the respective openings 18 an 20 of the frame 12. The circumferential recess 30 usually includes a front edge section 32 extending radially inwardly for a better retention of the lens 28 within the frame structure 12. However, due to the relatively rigid property of the frame structure and the lens 28 which is made of glass or rigid transparent plastic, the inwardly extending front edge section 32 must be restrictively limited in dimension in order to allow for pressing the lens 28 into the respective openings 18, 20 without damaging either the lens 28 or the frame structure 12.

FIGS. 2A–2D illustrate an eyewear of a type permitting air ventilation while in use, such as a pair of sunglasses, indicated by numeral 100 in accordance with one embodiment of the present invention. The sunglasses 100 are used as an example to illustrate one embodiment of the eyewear of the present invention. Nevertheless, any other type of eyeglasses which permit air ventilation with or without special air passages, such as prescription eyeglasses, protective work glasses, sports goggles, etc. are included in the concept of the present invention as illustrated by the embodiment 100 and further embodiments to be described hereinafter. The sunglasses 100 include a conventional frame structure which is similar to the frame structure 12 illustrated in FIGS. 1A–1C. Similar components of the frame structure 12 are indicated by similar numerals and will not be described in detail.

The sunglasses 100 further include a pair of lens units 102 removably attached to the frame structure 12 for covering the respective openings 18, 20 thereof. The pair of lens units 102 are identical, and the sunglasses 100 are symmetrical about a vertical centerline (not indicated). Therefore, reference will be made to only one of the lens units 102 attached to the frame section 14, for precision and convenience of description. The lens unit 102 includes a lens 104 which is made of glass or rigid transparent plastic. The lens 104 can be of any selected shading color such as those conventionally used for sunglasses, but can also be of crystal clear transparency for other applications such as protective or prescription eyeglasses. A rim element 106 is provided for encircling the lens 104.

The rim element 106 has an outer periphery shaped and sized to be snuggly fitted into the circumferential recess 30 in the inner periphery of the opening 18 of the frame section 14. The inner periphery of the rim element 106 is preferably formed with a radially inwardly projecting circumferential center lip 108 which is snuggly fitted into a corresponding circumferential groove 110 defined in the outer periphery of the lens 104. Thus, the rim element 106 firmly secures the lens 104 therein to form the lens unit 102 which is then removably attached to the frame section 14 of the frame structure 12.

Figure 2A:
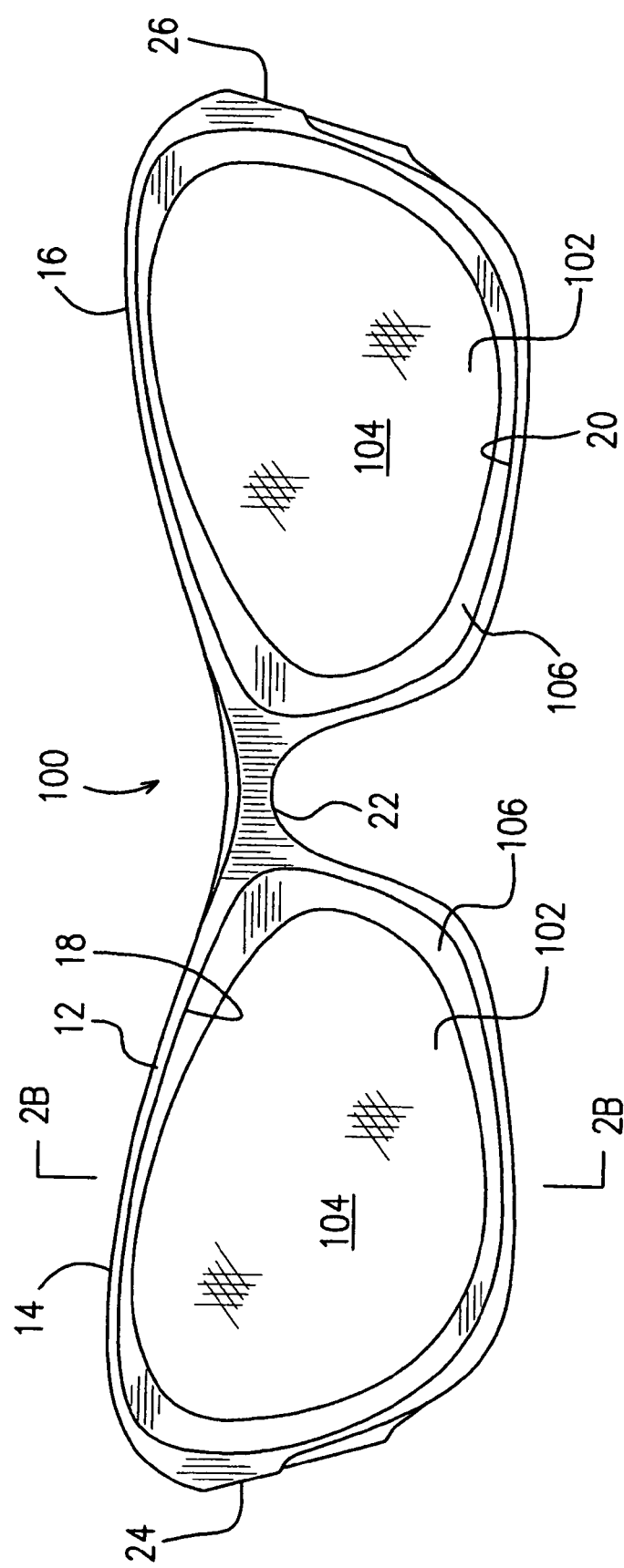
FIG. 2A is a front elevational view of a pair of sunglasses of the present invention, incorporating one embodiment thereof.
Figure 3A:
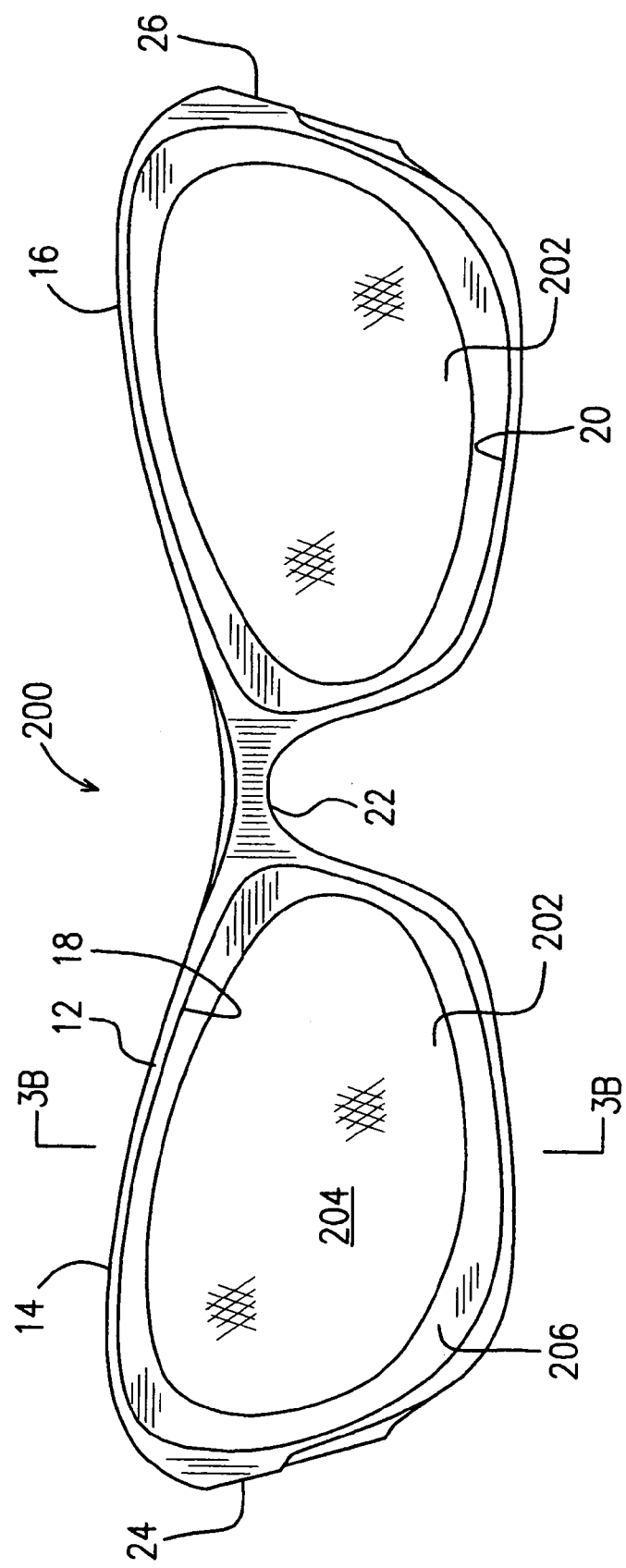
FIG. 3A is a front elevational view of a pair of sunglasses according to a second embodiment of the present invention.

The rim element 106 has a dimension preferably visible in the front view of the sunglasses 100 (as shown in FIG. 2A), when the lens unit 102 is attached to the frame structure 12. Such a dimension of the rim element 106 not only provides a means for providing aesthetic qualities to the sunglasses 100, but also provides a sufficient volume of mass to accommodate the selectively changeable properties of the sunglasses 100. The rim element is preferably in a color distinguishable from the color of both the lens 104 and the frame structure 12.

The rim 106 can be made of a material selected from a group of materials consisting of metal, plastics, rubber, wood, elastomeric material, and foam material. For example, rubber or elastomeric material provides the rim 106 with a better resiliency. Therefore, a more inwardly projecting front edge 32 of the circumferential recess 30 defined in the inner periphery of the opening 18 and can be configured for a better retention of the rim element 106 and thereby for a better retention of the lens unit 102 within the frame structure 12.

A metal rim 106 significantly increases the weight of the sunglasses 100 when heavier sunglasses are preferred. On the other hand, when lightweight sunglasses are preferred, rim element 106 can be made of plastics.

The aesthetic quality of rim element 106, especially when in colors different from those of the frame structure 12 and/or the lens 104, distinguishes the aesthetic qualities of sunglasses 100 from other sunglasses available in the market. The rim element 106 further provides a novel way of providing various aesthetic qualities to the configuration of the frame structure 12. For example, changing the geometry and size of the inner periphery of the rim element 106, while maintaining the size and geometry of the outer periphery of the rim element 106, makes it possible to configure the sunglasses 100 in various aesthetic appearances without changing the configuration of frame structure 12. This advantage of the present invention particularly benefits the manufacturers of eyewear by simplifying the design and manufacturing processes of frame structures, and also benefits consumers by allowing them to meet several kinds of eyewear needs at a reduced overall cost. This advantage of the present invention will be better understood with reference to embodiments to be further described hereinafter.

FIGS. 3A–3D illustrate a second embodiment of the present invention in which a pair of sunglasses 200 includes a conventional frame structure 12 which is similar to the frame structure 12 illustrated in FIGS. 1A–1C, with similar parts indicated by similar numerals, which will not be redundantly described herein. The sunglasses 200 further include a pair of lens units 202 removably attached to each of the frame sections 14, 16, respectively. Reference will only be made to the lens unit 202 attached to the frame section 14, for precision and convenience of description.

Lens unit 202 includes a lens 204 which is similar to lens 104 of FIG. 2D, and a rim element 206 encircling the lens 204. Sunglasses 200 are particularly for use during water sports, such as water skiing or motor boating. Therefore it is preferable that sunglasses 200 are floatable in water. In order to allow sunglasses 200 to float, the rim element 206 is preferably made of a foam material 212 encased in an outer layer of flexible plastic sheeting 214. The rim element 206 has an outer periphery snuggly fittable into the circumferential recess 30 defined in the inner periphery of the opening 18 of the frame section 14, for the removable attachment of the lens unit 202 to the frame structure 12. The rim element 206 has an inner periphery with a radially inwardly projecting circumferential center lip 208 snuggly fitted into a corresponding circumferential groove 210 in the lens 204, for firmly securing the lens 204 therein. The rim element 206 is not only visible in the front view of the sunglasses 200 but must also include a sufficient volume of the foam material 212, in order to ensure the floatability of the sunglasses 200. Thus, the rim element 206 has larger radial and axial dimensions relative to those of rim element 106 of the embodiment illustrated in FIG. 2C.

FIG. 3D illustrates an alternative configuration of the rim element, indicated by numeral 206'. The rim element 206' includes a body 213 made of wood material, having an outer periphery similar to that of the rim element 206. In contrast to the configuration of the rim element 206 of FIG. 3C, rim element 206' includes an additional rear section 218 of wood material, extending further inwardly into the opening 18 of the frame section 14 behind the lens 204 in order to provide an even larger axial dimension of the rim element 206'. A circumferential groove 220 is defined in the inner periphery of the rim element 216 so that the outer periphery of lens 204 is securely affixed within the circumferential groove 220, thereby forming the lens unit 202, which enables sunglasses 200 to be floatable in water. The rear section 218 is preferably separated from the body 213 and is attached thereto by, for example, glue, after the lens 204 is attached to the body 213 of the rim element 206'. Thus, the lens is not detachable from the rim element 206' after the lens unit 202 is formed.

Figure 4A:
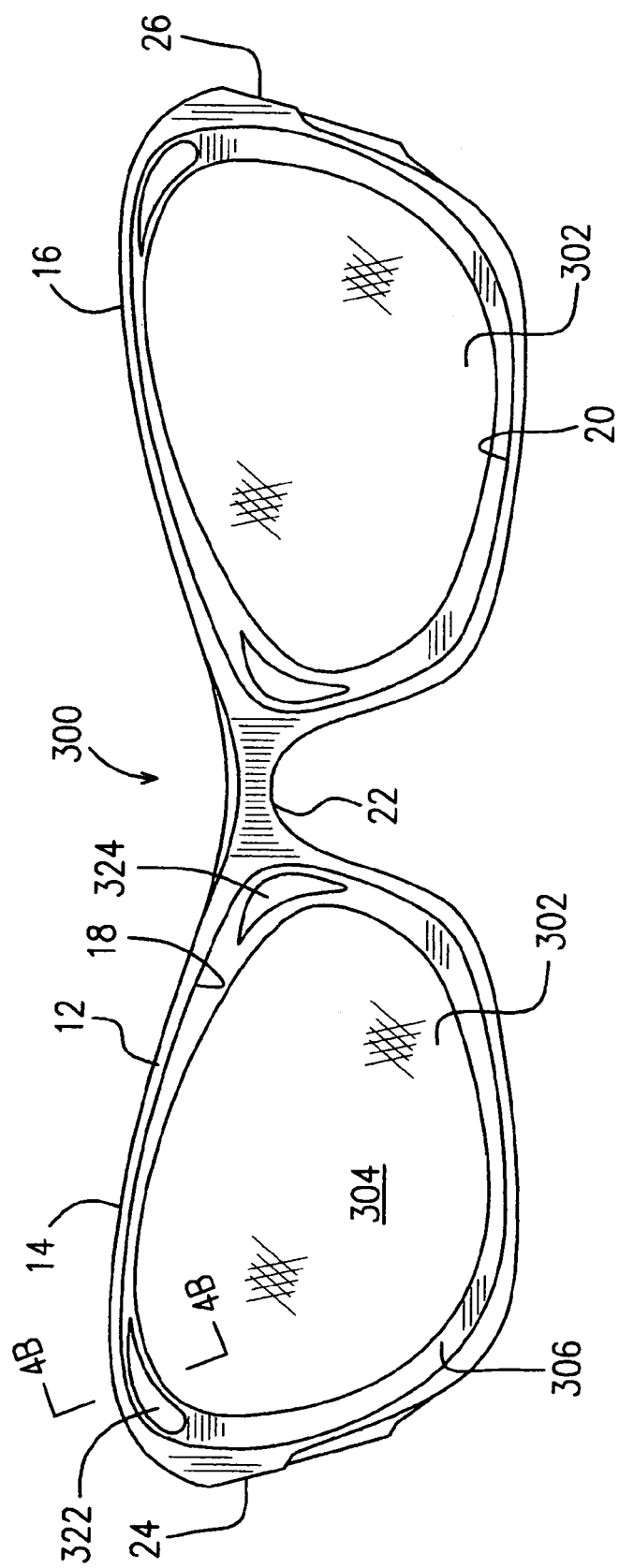
FIG. 4A is a front elevational view of a pair of sunglasses having air ventilation passages, according to a third embodiment of the present invention.

FIGS. 4A and 4B illustrate a third embodiment of the present invention in which a pair of sunglasses 300 are adapted to provide a better air ventilation while in use, which is desirable especially when a user wears the sunglasses 300 during sports activities. Sunglasses 300 include a conventional frame structure 12 as illustrated in FIGS. 1A–1C, with similar parts indicated by similar numerals, and therefore the frame structure 12 will not be redundantly described herein. Sunglasses 300 further include a pair of lens units 302 removably attached to the respective frame sections 14. 16 in order to cover the respective openings 18 and 20. Reference will be made to only one of the lens units 302 for precision and convenience of description.

The lens unit 302 includes a lens 304 which is similar to lens 104 of FIG. 2D, and a rim element 306 encircling the lens 304. The rim element 306 is made of a metal or a rigid plastic material, as per a user's preference, and has a dimension such that the rim element 306 is visible in the front view of sunglasses 300. The rim element 306 has an outer periphery shaped and sized to be snuggly fittable into the circumferential recess 30 defined in the inner periphery of the opening 18 of the frame section 14. A radially, inwardly projecting circumferential lip 308 is formed at a center portion of the inner periphery of the rim element 306, and is securely fitted into a circumferential groove 310 in the outer periphery of the lens 304. The lens 304 and the rim element 306 thereby form the lens unit 302 which is removably attachable to the frame structure 12.

The rim element 306 includes air passages defined by openings 322 and 324 which are positioned in an upper portion at opposed ends of the rim element 306, respectively. The respective openings 322, 324 (only the opening 322 is shown in FIG. 4B) extend axially through the rim element 306 in order to facilitate air ventilation. Thus, the moisture evaporating from the user's skin can be vented not only through the space defined between the frame structure 12 and the user's face, but also through the respective openings 322 and 324. The respective openings 322, 324 are preferably configured with curved and/or pointing outline in order to provide additional aesthetic features to the sunglasses 300.

Figure 5A:
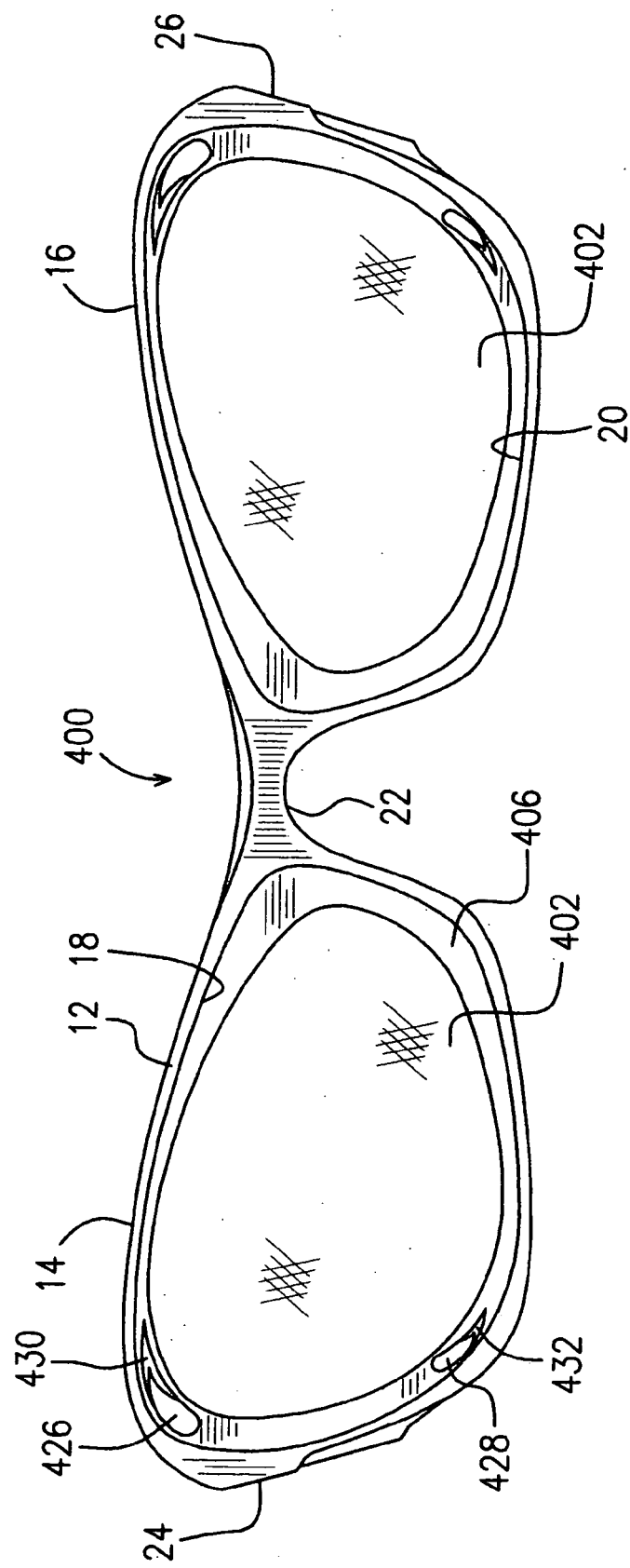
FIG. 5A is a front elevational view of a pair of sunglasses having an alternative air ventilation arrangement, according to a fourth embodiment of the present invention.

FIGS. 5A and 5B illustrate a pair of sunglasses 400 in accordance with a fourth embodiment of the present invention. The sunglasses 400 are also adapted to facilitate air ventilation while in use. The sunglasses 400 are similar to the sunglasses 300 of FIG. 4A, and therefore similar parts and features will not be redundantly described herein. It is noted that the frame structure and its parts of the sunglasses 400 are identical to the frame structure 12 of FIG. 4A and are indicated by similar numerals. The lens units of the sunglasses 400 are indicated by numeral 402. The parts and features of the lens unit 402 which are similar to the parts and features of the lens unit 302 of FIG. 4A are indicated by numerals with similar last two digits, and therefore will not be described in detail.

The difference between the sunglasses 300 of FIG. 4A and the sunglasses 400, lies in that the air passages are configured and positioned differently. Rim element 406 defines two axially extending openings 426, 428 which are positioned in the respective upper and lower portions and at the outer end of rim element 406. Each of the respective openings 426, 428 defines a peripheral edge at the rear side of the lens unit 402 (see FIG. 5B) dimensioned smaller than the peripheral edge of the same opening at the front side of the lens unit 402 (see FIG. 5A), thereby forming specially configured recesses 430, 432 which are visible from the front view of the sunglasses 400.

In view of the sunglasses 300 and 400 illustrated in FIG. 4A and FIG. 5A, it should be noted that the air passages extending through a rim element of a pair of sunglasses can be configured and positioned differently in accordance with the present invention, in order to meet selected ventilation requirements and varied aesthetic preferences.

FIGS. 6A–6D illustrate a pair sunglasses 500 in accordance with a fifth embodiment of the present invention in which a plurality of retaining elements in a spaced-apart relationship are provided to an inner periphery of openings of the frame structure for releasably securing rim elements of a pair of respective lens units.

In particular, the pair of sunglasses 500 includes a frame structure 31 with two frame sections 33, 34, and a bridge 36 interconnecting the frame sections 33, 34 and extending between the inner ends of the respective frame sections 33, 34. A pair of temples 38, 40 (substantially hidden behind the sunglasses 500 in the illustration of FIG. 6A) are pivotally attached to the frame structure 31. The frame structure 31 defines a pair of openings 42, 44 within the respective frame sections 33 and 34 which are covered by a pair of lens units 502. The lens units 502 are identical, and the frame structure 31 is symmetrical about its vertical centerline (not shown). Therefore, reference will be made only to the frame section 33 and one of the lens units 502 removably attached thereto, for precision and convenience of description. The lens unit 502 is similar to the lens unit 102 of FIGS. 2A–2D and includes similar parts indicated by numerals having similar last two digits and will not be redundantly described herein.

In contrast to the rim element 106 of FIG. 2A, the rim element 506 includes radially inwardly enlarged upper and lower portions 534, 536 positioned at the outer end of the rim element 506. Air passages formed by narrow openings 538, 540 are formed in the respective upper and lower portions 534, 536 of the rim element 506, which extend radially through the rim element 506 for facilitating air ventilation while the sunglasses 500 are in use. The configuration of the rim 506 and the openings 538 and 540 also provide an aesthetic feature to the sunglasses 500.

The sunglasses 500 are further characterized by the retaining elements of the frame structure 31. The frame section 33 defines a front surface 46 surrounding the opening 42 which abuts the rear side of the rim element 506 when the lens unit 502 is removably attached to the frame section 33 of the frame structure 31. A retaining section 48 projects forwardly from the front surface 46 of the frame section 33 and defines a groove 50 in the inner periphery thereof extending through the entire length of the retaining section 48. The length of retaining section 48 extends from an upper end 52 thereof at the top of the frame section 33 remote from the outer end thereof where the temple 38 is pivotally attached, and terminates at a lower end 54 thereof located at the middle bottom of the frame section 33. The retaining section 48 is preferably integrated with the frame structure 31, and presents a smooth extension of the bridge 36. A side retainer 56 shaped as a reversed letter "L" extends forwardly from the front surface 46 at the outer end of the frame section 33, such that the side retainer 56 is circumferentially spaced apart from the two ends 52, 54 of the retaining section 48. The rim element 506 of the lens unit 504 is removably attached to the frame section 33 by insertion into the groove 50 of the retaining section 48 through the ends 52, 54, and then by pressing the lens unit 502 towards the front surface 46 of the frame section 33 to snap into engagement with the side retainer 56. When the lens unit 502 is pressed outwardly from the rear side thereof it will be snapped out of engagement with the side retainer and can then be removed from the frame section 33. This retaining elements of the frame structure 31 provides an optimal retention of the lens unit 502 to the frame structure 31.

When the lens unit 502 is attached to the frame section 33, the visible circumferential outline of the rim element 506 is interrupted by the circumferentially spaced retaining section 48 and the side retainer 56, thereby presenting an aesthetic feature different from the other embodiments previously described.

FIGS. 7A–7D illustrate a sixth embodiment of the present invention in which a pair of sunglasses 600 includes a frame structure 60 with two frame sections 62, 64 and a bridge 66 extending between inner ends of the respective frame sections 62, 64, to interconnect same. A pair of temples 68, 70 are pivotally attached to the outer ends of the respective frames sections 62, 64. A pair of openings 72, 74 are defined within the respective frame sections 62, 64. A pair of lens units 602 (only one illustrated in FIG. 7A) are removably attached to the frame structure 60 to cover the respective openings 72, 74.

The lens unit 602 includes a lens 604 and a rim element 606 encircling the lens 604 in a way similar to the lens unit 102 (see FIGS. 2A–2D) and will not be redundantly described. Specially configured openings 642, 644 and 646 are defined in the rim element 606 to form air passages extending through the rim element 606. The openings 642, 644 and 646 are positioned individually at an upper portion at the outer end, an upper portion at the inner end, and a lower portion at the inner end of the rim element 606, in order to provide a selected ventilation function and a preferred aesthetic feature of the sunglasses 600. The lens unit 602 is removably attached to the frame section 62 in a way substantially similar to that described with reference to the first embodiment illustrated in FIGS. 2A–2D. Nevertheless, additional retaining elements are provided to the rim element 606 for a more secure retention of the lens unit 602. A plurality of retaining elements 648, 650, 652 and 654 are provided at the outer end of the rim element 606, which project outwardly from the outer periphery of the rim element 606 and are disposed in a spaced apart relationship. The retaining elements 648, 650, 652 and 654 are sized in a reduced sequence and are configured in a pointing configuration for a preferred presentation. Each of the retaining elements 648–654 includes a smoothly convex front surface 656 and a flat back surface 658, in combination forming side edges 660, 662. The rim element 606 further includes a retaining element 664 similar to the retaining elements 648–654, but being positioned in the upper portion at the inner end of the rim element 606.

The frame section 62 of the frame structure 60 defines a plurality of recesses 648', 650', 652', 654' and 664', configured to correspond with the configuration of the respective retaining elements. Each of the recesses 648'–654' and 664', is positioned to correspond with the position of the respective retaining elements 648–654 and 664, for accommodating same. In particular, each of the recesses 648'–654' and 664' is defined at the inner periphery of the opening 72 and extends outwardly into the body of the frame section 62, including a flat back surface 658' and two curved side surfaces 656', thereby in combination forming two side grooves for engagement with the side edges 660, 662 of the retaining element accommodated therein. The grooves defined between the flat back surface 658' and the respective curved side surfaces 656' are exaggerated in the illustration of FIG. 7D for convenience of description.

The retaining elements 648–654 and 664 of the rim element 606 and the recesses 648'–654' and 664' of the frame section 62 provide additional retention security when the lens unit 602 is removably attached to the frame structure 60.

It should also be noted that the present invention provides a lens unit removably attachable to a frame structure, but the attachment of a lens to its rim element may not necessarily be detachable, such as in the embodiment illustrated in FIG. 3D. Thus, in accordance with a further aspect of the present invention, a method is provided for assembly of an eyewear with interchangeable lens units. A plurality of interchangeable lens units are provided to be accommodated by a same frame structure. The interchangeable lens units include some having rim elements made of different materials, some having rims configured differently with or without air passages such that selecting a pair of particular interchangeable lens units to be attached to the frame structure of an eyewear will allow incorporation of selected features to the eyewear as preferred. These interchangeable lens units include all types of rim elements described in this application. For example, a pair of sunglasses for normal use can have lens units made of metal or plastic material, according to the user's preference. When the sunglasses are used during sports activities such as running or jogging, the user can replace the lens units which are attached to the sunglasses for a normal use with a pair of selected interchangeable lens units with a preferred style of air passages. When the user wears the same sunglasses during water sports, such as water skiing, the user may replace the lens units attached to the frame structure with a pair of lens units having rim elements made of foam material or wood in order to ensure that the sunglasses are floatable in water.

The preferred properties of the lens unit may not come from the rim elements but could be the particular properties of the lenses. For example, a pair of eyeglasses may have a pair of reading lenses and a pair of distance lenses which are both provided in the interchangeable lens units. Thus, the user needs only one pair of eyeglasses with a pair of additional interchangeable lens units, instead of having to carry two pairs of glasses, one for reading and the other for distance viewing. This is particularly advantageous for travelers.

The present invention can be applied to a further, broader extent such that a user can have a pair of eyeglasses with a group of selected interchangeable lens units allowing the eyeglasses to be used as a selected type of prescription glasses for reading or distance viewing, or as sunglasses with or without air passages and with or without floatability, or as other types of eyeglasses as required.

It should also be noted that although the embodiments of the present invention are described with reference to a pair of sunglasses, these embodiments are examples only for the purpose of illustrating the principle of the present invention. The present invention can be applicable to other types of eyewear such as any type of eyeglasses, goggles with two lenses or with one single lens.

FIGS. 8A–8C illustrate a pair of goggles, generally indicated by numeral 700, in accordance with a seventh embodiment of the present invention. The goggles 700 include a frame structure 712 having two frame sections 714, 716 defining openings 718, 720 therein, respectively. Each of the frame sections has a lens 704 affixed within the respective openings 718, 720. A double-bridge 722 interconnects the two frame sections 714 and 716, and extends between the inner ends thereof. The double-bridge 722 defines an elongate opening 710 extending therethrough, functioning as a ventilation passage of the goggles 700.

Shielding member 708 is integrally formed with the frame structure 712 and protrudes from the inner side of the frame sections 714, 716, extending around the outer periphery of the frame structure 712. The shielding member 708 is contoured for contacting or for being disposed in a close relationship with a portion of the user's face around the eyes of the user when the goggles 700 are worn. Thus, the entire shielding member 708 forms a substantial enclosure between the lenses 728 and the face of the user for a shielding protection of the user's eyes in addition to the shielding protection provided by the lenses 704.

The goggles 700 further include an elastic strip (not shown) which is conventionally attached to the opposed outer ends of the frame structure 712, for securing the goggles 700 on the user's head when the goggles 700 are worn.

The frame structure 712 including the frame sections 714, 716 and the double-bridge 722 therebetween are preferably made of a substantially rigid plastic material. Each lens 704 which is made of glass or rigid transparent plastic with or without colour shading, is provided with a rim element 706. The rim element 706 encircles the lens 704, thereby forming a lens unit 702. Each of the frame sections 714, 716 defines a front surface 746 (see FIG. 8C) surrounding the opening and abutting the rear side of the rim element 706 when the lens unit 702 is removably attached to the frame sections 714, 716 respectively, of the frame structure 712.

Figure 6A:
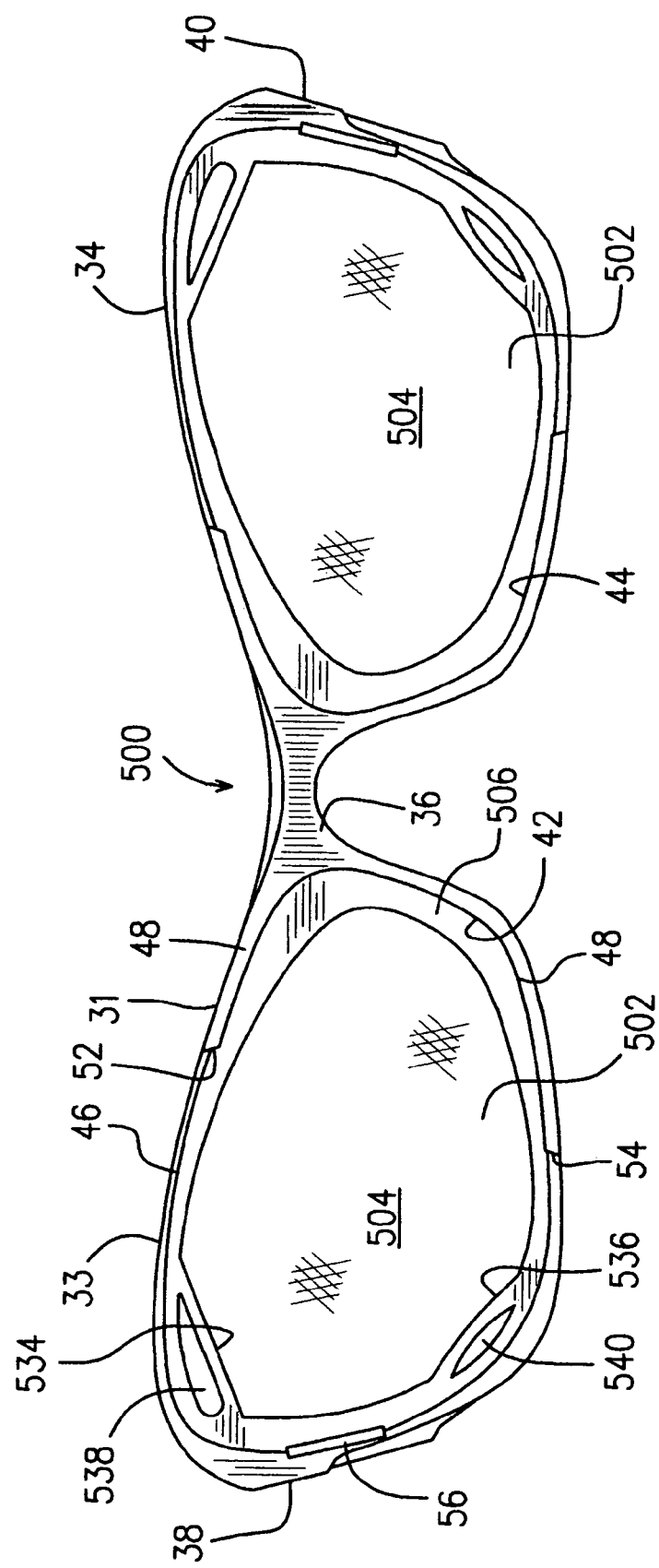
FIG. 6A is a front elevational view of a pair of sunglasses having retaining elements on the frame structure thereof, according to a fifth embodiment of the present invention.
Figure 7A:
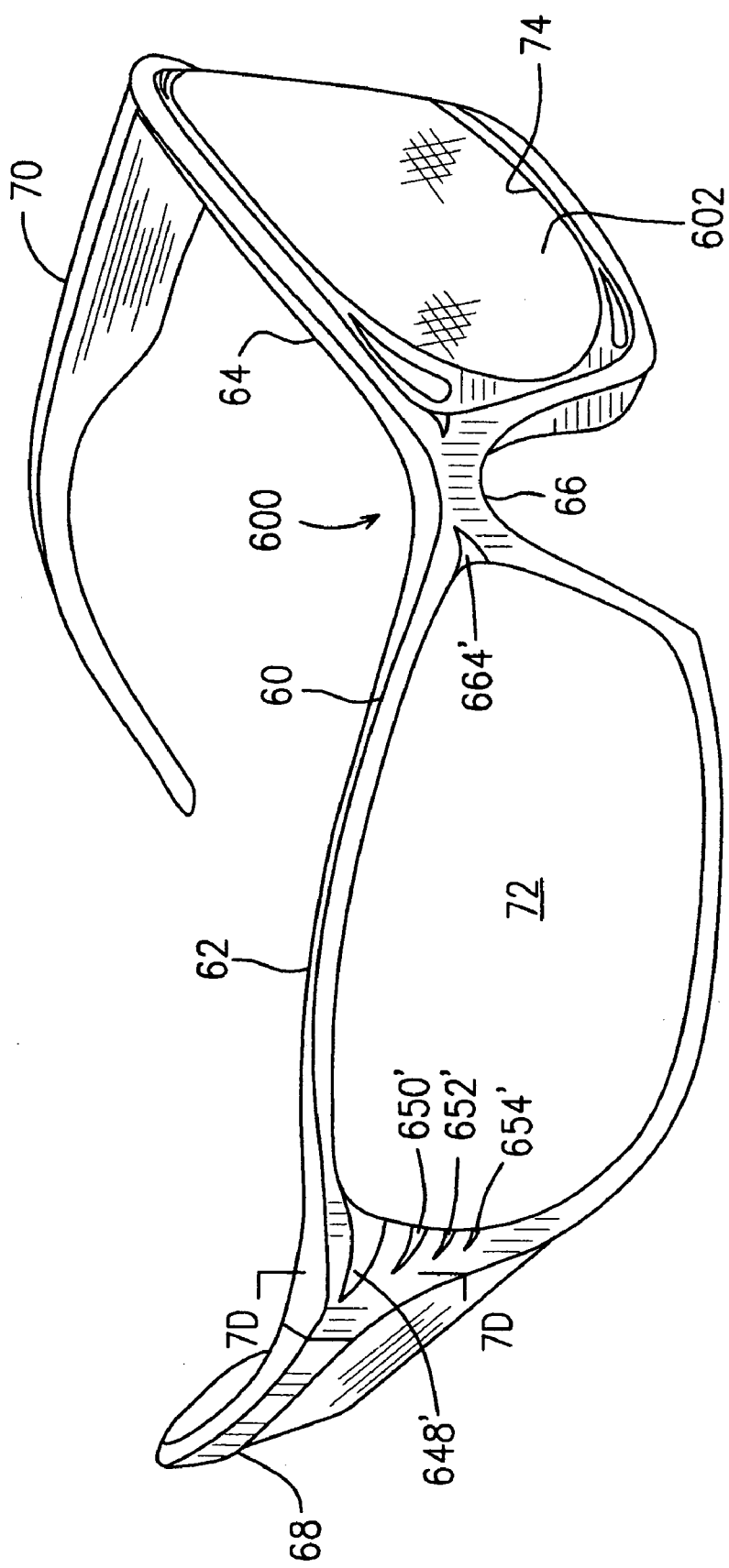
FIG. 7A is a perspective view of a pair of sunglasses having projecting retaining elements on the lens units, according to a sixth embodiment of the present invention, with one lens unit removed therefrom.

The lens unit 702 is similar to the lens unit 502 of FIGS. 6A–6C. The similar parts and features will not be redundantly described herein. The air passages formed by narrow openings 538, 540 in the rim element 506 of FIG. 6A are optional to the rim element 706 of the goggles 700, and are not shown in the illustration of the goggles 700.

The goggles 700 are symmetrical about a vertical centerline (not shown) and the frame section 716 is identical to the frame section 714. Hereinafter reference will be made only to the frame section 714 and one of the lens units 704, for precision and convenience of description. Similar to the retaining section 48 of the sunglasses 500 of FIGS. 6A–6C, retaining section 748 projects forwardly from the front surface 746 of the frame section and defines a groove (not shown) in the inner periphery thereof extending along the entire length of the retaining section 748. The length of the retaining section 748 extends from an upper end 752 thereof at the top of the frame section 714 apart from the outer end thereof where the elastic strip is attached, and terminates at a lower end 754 thereof located at the middle bottom of the frame section 714. The retaining section 748 is preferably integrated with the frame structure 712, and presents a smooth extension of the double-bridge 722.

The retaining feature of the frame section 714 has thus far been similar to that of the frame section 33 of the sunglasses 500 of FIGS. 6A–6C. Nevertheless, instead of having an L-shaped side retainer 56 of FIG. 6B, the frame section 714 includes a central retainer 756 extending from the outer end of the frame section 714 into the opening 718, and being snuggly received within a recess 758 defined in the outer end of the rim element 706, and contoured accordingly. The central retainer 756 has a slightly projecting but smoothly rounded front edge (not indicated but clearly illustrated in FIG. 8C) such that the lens unit 702 can be forced to "click-in", and be securely retained in the frame section 714 by the retaining section 748 and the central retainer 756 when the lens unit 702 is slid into the groove behind the retaining section 748. The central retainer 756 inserts into the recess 758 of the rim element 706 of the lens unit 702, thereby providing a better retention of the lens unit 702 within the frame section 714, in contrast to the L-shaped side retainer 56 of the sunglasses 500 of FIG. 6A. Furthermore, the central retainer 756 inserting into the recess 758, prevents the lens unit 702 from moving and thereby maintains the lens unit 702 in position when the lens unit 702 is attached to the frame section 714.

Figure 9:
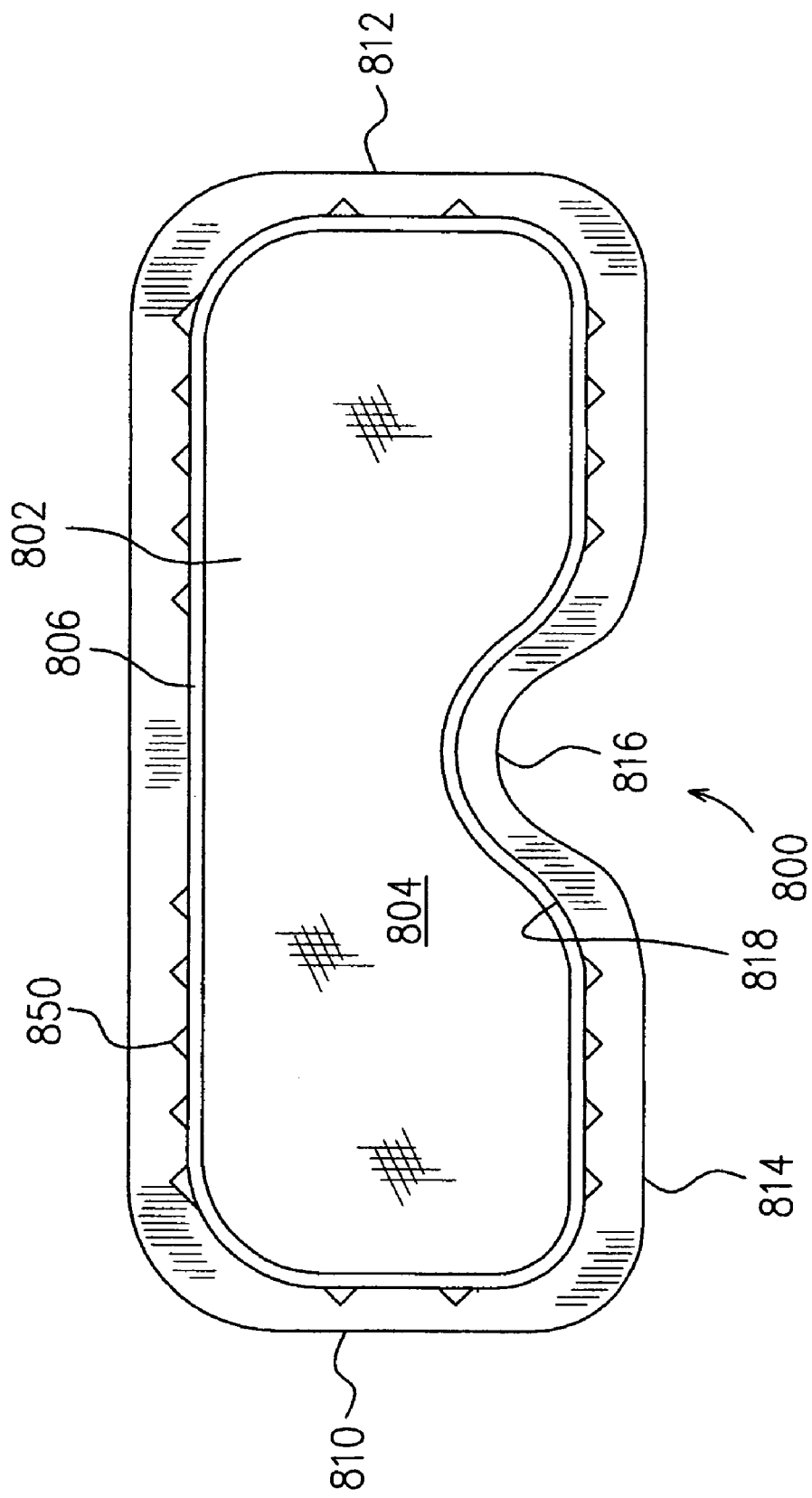
FIG. 9 is a front elevational view of a single lens goggles, illustrating an eighth embodiment of the present invention.

FIG. 9 illustrates an eighth embodiment of the present invention which includes a single lens goggles 800. The goggles 800 include a frame structure 814 defining a nose section 816 at the middle bottom thereof, and an opening 818 of the frame structure 814 for receiving a lens unit 802 which is removably affixed in the opening 818 of the frame structure 814. The single lens goggles 800 further include an elastic strip (not shown) to be attached to the opposed ends 810 and 812 of the frame structure 814, by any well known means, for holding the single lens goggles 800 on a user's head when the single lens goggles 800 are worn. The frame structure 814 further includes shielding members (not shown) extending from the inner side of the frame structure 814 towards the user's face and is contoured accordingly such that the shielding member forms a substantial enclosure around the user's eyes to provide a complete shielding to the upper portion of the user's face, in combination with the lens unit 802.

The lens unit 802 includes a rim element 806 encircling a lens 804 and therefore securely engages the lens 804 therein, which is similar to the formation of the lens units described in previous embodiments of the present invention.

The lens unit 802 is attached to the frame structure 814 of the single lens goggles 800 in a manner similar to that described with reference to sunglasses 100 of FIGS. 2A–2D, and will not be redundantly describe herein. Optionally, the rim element 806 includes a plurality of retaining elements 850 extending outwardly from the outer periphery of the rim element 806 and snuggly received in a plurality of corresponding recesses (not indicated) defined in the inner periphery of the frame structure 814. The retaining elements 850 and their corresponding recesses may be shaped and positioned differently from the retaining elements 648 and the recess 648' of FIGS. 7B and 7A, sunglasses 600 of FIG. 7A. However, the retaining elements 850 and their corresponding recesses have a cross-section similar to those of the retaining elements 648 of FIG. 7C and of the recess 648' of FIG. 7D. Therefore, in a manner similar to those described with reference to the sunglasses 600 of FIGS. 7A–7D, the retaining elements 850 on the rim element 806 of the lens unit 802 and their corresponding recesses in the frame structure 814 provide additional retention security when the lens unit 802 is removably attached to the frame structure 814.

The embodiments of FIGS. 8A and 9 are examples used to illustrate that various aspects and features of the present invention are also applicable to the goggles. However, those examples do not limit the application of the present invention to the goggles only in the described embodiments.

Although the present invention is more advantageous in applications of eyewear permitting air ventilation which usually include rigid frame structures, the principle of the present invention is also applicable to various types of goggles, such as swimming or diving goggles, snow skiing and other types of winter goggles which usually have flexible sealing elements on the frame structures.

Modifications and improvements to the above-described embodiments of the present invention may become apparent to those skilled in the art. The foregoing description is intended to be exemplary rather than limiting. The scope of the present invention is therefore, intended to be limited solely by the scope of the appended claims.

I claim:

1. A method for assembling eyewear comprising:
providing a frame structure for the eyewear, the frame structure defining at least one opening;
providing a lens unit including a lens and a rim element encircling the lens, the rim element defining an air venting passage to vent moisture; and
removably attaching the lens unit to the frame structure to cover the opening.

2. The method as claimed in claim 1 comprising selective replacement of the lens unit attached to the frame structure with another lens unit when changing properties of the eyewear is desirable.

3. The method as claimed in claim 1 comprising steps of:
providing a plurality of interchangeable lens units, the rim elements of the respective interchangeable lens units being different, and the respective interchangeable lens units being adapted to be removably attached to the opening of the frame structure for replacement of one with another; and
selecting one of the interchangeable lens units to replace the lens unit having been attached to the opening of the frame structure.

4. The method as claimed in claim 3 wherein the interchangeable lens units comprise a lens unit having a rim element made of metal material.

5. The method as claimed in claim 3 wherein the interchangeable lens units comprise a lens unit having a rim element made of rubber material.

6. The method as claimed in claim 3 wherein the interchangeable lens units comprise a lens unit having a rim element made of a material selected from wood and foam material.

7. The method as claimed in claim 3 wherein the interchangeable lens units comprise a lens unit having a rim element made of plastic material.

8. Eyewear comprising:
a frame structure defining at least one opening;
a lens unit removably attached to the frame structure and covering the opening thereof, the lens unit including a lens and a rim element encircling the lens, the rim element defining an air venting passage to vent moisture; and
a plurality of interchangeable lens units adapted for selective replacement of the lens unit attached to the frame structure.

9. The eyewear as claimed in claim 8 wherein the rim elements of the respective interchangeable lens units are made of different materials.

10. The eyewear as claimed in claim 8 wherein the rim elements of the respective interchangeable lens units are made in different colors.

11. The eyewear as claimed in claim 8 wherein the frame structure comprises a plurality of retaining elements defined in a spaced-apart relationship at an inner periphery of the opening for releaseably retaining the rim element of the respective interchangeable lens units.

12. Eyewear permitting air ventilation when in use, comprising:
a frame structure defining a pair of openings;
a pair of lens units removably attached to the frame structure for covering the respective openings thereof; and
each of the lens units including a lens and a rim element encircling the lens, the rim element defining an air venting passage to vent moisture.

13. The eyewear as claimed in claim 12 wherein the rim element of the respective lens units is made of a material other than a material of the lens.

14. The eyewear as claimed in claim 12 wherein the rim element of the respective lens units is made of a material selected from a group of materials consisting of metal, plastics, rubber, wood, elastomeric material and foam material.

15. The eyewear as claimed in claim 12 wherein the rim element of the respective lens units is dimensioned to be visibly distinguishable from both the lens and the frame structure.

16. The eyewear as claimed in claim 12 wherein the frame structure comprises at least one retaining element disposed on an inner periphery of each of the openings, and wherein each of the rim elements comprises at least a recess defined in an outer periphery thereof for removably engaging the at least one retaining element of the frame structure.

17. The eyewear as claimed in claim 12 wherein the rim element of the respective lens units comprises at least one retaining element projecting outwardly from an outer periphery of the rim element for a releasable attachment to the frame structure.

18. The eyewear as claimed in claim 17 wherein the frame structure comprises at least one recess defined at an inner periphery of the respective openings for accommodating the retaining element of the respective lens units.

* * * * *